United States Patent [19]

Sachdev et al.

[11] Patent Number: 4,549,824

[45] Date of Patent: Oct. 29, 1985

[54] INK ADDITIVES FOR EFFICIENT THERMAL INK TRANSFER PRINTING PROCESSES

[75] Inventors: Krishna G. Sachdev, Wappingers Falls; Ari Aviram, Yorktown Heights, both of N.Y.

[73] Assignee: International Business Machines Corporation, Armonk, N.Y.

[21] Appl. No.: 567,211

[22] Filed: Dec. 30, 1983

[51] Int. Cl.[4] .......................... B41J 3/16; B41J 31/02; C09D 11/02; G01D 15/10

[52] U.S. Cl. ................................ 400/241.1; 400/120; 106/20; 346/76 PH; 346/76 L; 346/208; 346/209; 428/913; 430/945

[58] Field of Search .................. 106/20; 524/189, 192; 430/194, 195, 197, 945; 346/208, 209, 76 PH; 428/913; 400/118, 120, 241.1

[56] References Cited

U.S. PATENT DOCUMENTS

| | | | |
|---|---|---|---|
| 1,845,989 | 2/1932 | Schmidt | 430/194 |
| 3,230,087 | 1/1966 | Sus | 430/195 |
| 3,298,833 | 1/1967 | Gaynor | 430/290 |
| 3,321,309 | 5/1967 | Reichel | 430/167 |
| 3,532,500 | 10/1970 | Priest | 430/194 |
| 3,705,911 | 12/1972 | Thomson | 524/189 |
| 3,744,611 | 7/1973 | Montanari et al. | 346/76 |
| 3,779,774 | 12/1973 | Cope | 430/197 |
| 4,031,068 | 6/1977 | Cantor | 525/351 |
| 4,106,938 | 8/1978 | Fletcher | 430/194 |
| 4,140,907 | 2/1979 | Oba | 400/121 |
| 4,268,368 | 5/1981 | Aviram et al. | 204/181 C |
| 4,305,082 | 12/1981 | Kusakawa et al. | 346/76 R |
| 4,334,006 | 6/1982 | Kitajima | 430/254 |
| 4,491,432 | 1/1985 | Aviram | 400/241.1 |

FOREIGN PATENT DOCUMENTS

| | | |
|---|---|---|
| 52-39742 | 3/1977 | Japan . |
| 1125194 | 8/1968 | United Kingdom . |
| 355203 | 11/1972 | U.S.S.R. . |

*Primary Examiner*—Dennis L. Albrecht
*Attorney, Agent, or Firm*—Sughrue, Mion, Zinn, Macpeak, and Seas

[57] ABSTRACT

By adding an aromatic azido compound which exotherms at the conditions of thermal ink transfer to a thermal transfer ink, an improved thermal transfer ink and thermal transfer ink process are achieved.

50 Claims, 9 Drawing Figures

INK ADDITIVES FOR EFFICIENT THERMAL INK TRANSFER PRINTING PROCESSES

BACKGROUND OF THE INVENTION

1. Field of the Invention

The present invention relates generally to an improved recording material for thermal ink transfer printing processes, and particularly to ink additives for efficient image transfer onto a plain paper.

DESCRIPTION OF THE PRIOR ART

IBM Technical Disclosure Bulletin Vol. 18, Nov. 12, May, 1976, page 4142, discloses a thermal laser transfer printing process. Laser light is focused on an ink covered ribbon and the laser energy is absorbed by the ink which is transferred to a recording member, normally paper, to leave a permanent mark. To reduce the energy required to transfer ink, materials which undergo exothermic decomposition, specifically ammonium perchlorate, picric acid and triphenylmethane dyes are added to the ribbon.

U.S. Pat. No. 4,031,068 S. E. Cantor discloses the use of sulfonyl azido moiety containing antioxidants for the purpose of protecting organic polymers against oxidative degradation caused by heat or light.

U.S. Pat. No. 4,305,082, Kusakawa et al, discloses an electric heat recording system and electric heat recording sheet for recording electric signals on a thermosensitive recording paper and a regular paper. Other background references include: "Thermal Ink-Transfer Imaging", Yukio Tokunaga and Kiyoshi Sugiyama; IEEE Transactions on Electron Devices, Vol. ED-27, 1, January, 1980; Y. Tokunaga and K. Sugiyama, "Thermal Ink-Transfer Imaging and Its Applications", in SPSE/SPIE Tokyo Symp. 77 on Photo- and Electro-Imaging, pp. 7.1-7.8, 1977; and Franco Knirsh, "Advances in Non-Impact Printing Technologies", J. Gaynor, Ed., Van Nostrand Reinhold Co., 1983, p. 921.

Typical thermal ink transfer printing processes are disclosed in U.S. Pat. Nos. 4,329,071, 3,719,261, 3,764,611 and 4,305,082 Kusakawa et al.

The present invention finds application with ink and in ink transfer printing processes as disclosed in the above patents.

IBM Docket YO 9-82-002 Aviram et al discloses the use of exothermic materials in thermal transfer printing. The use of azido compounds per the present invention, e.g., p-azidobenzoic acid, offers the following advantages over the compounds disclosed therein, e.g., the azo compounds disclosed:

They are non-toxic;

They can be used in water-based or organic solvent-based ink formulations;

The heat released per unit weight is much higher;

Thermally-induced exothermic transformation occurs at a relatively lower temperature. Thus printing can be accomplished at a lower input energy.

SUMMARY OF THE INVENTION

Improved thermal ink transfer printing materials which require lower energy for recording electric signals as symbols or figures on a plain paper are obtained by incorporation of one or more aromatic azido compounds to the ink formulations prior to forming the ink layer in the process of fabrication of the printing materials. Alternatively, the aromatic azido compound(s) can be located in a separate layer or in the substrate, though the latter is not preferred due to the possibility of heat build-up.

One object of the present invention is to provide improved thermal transfer inks which have lower print energy requirements for thermal ink transfer.

Another object of the present invention is to provide an improved electric heat recording material by utilizing the heat generated in the exothermic transformation of additives incorporated in printing inks, to cause the ink to melt and achieve the lower viscosity necessary for its transfer requiring a low electrical energy input.

Another object of the present invention is to provide modified inks by the use of additives such that the ink transfer can be accomplished at a lower input energy with improved print head life, print quality and ink transfer efficiency.

Another object of the present invention is to provide improved thermal transfer inks which provide improved print quality.

Yet a further object of the present invention is to provide an improved thermal ink transfer printing process using thermal inks as above described.

DESCRIPTION OF PREFERRED EMBODIMENTS OF THE PRESENT INVENTION

The background of the present invention will firstly be set.

Figure 1:
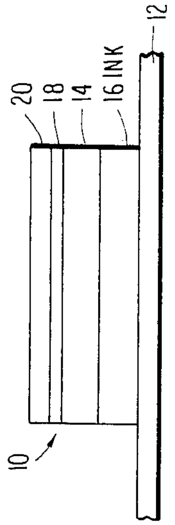
FIG. 1 schematically illustrates a suitable ribbon for the practice of this invention in which the aromatic azido compound of the present invention is present in the ink layer.

In FIG. 1, the ink bearing ribbon 10 is located adjacent to the receiving medium 12, and includes a support layer 14, an ink bearing layer 16, a conductive material 18, and a resistive material 20. This type of ribbon is often used in resistive ribbon transfer printing. The aromatic azido compound is in ink layer 16. The nature of the various layers in ribbon 10 and their thicknesses are well known in the art. For example, the resistive layer 20 can be comprised of graphite dispersed in a binder, as is well known, or can be comprised of an inorganic resistive material, preferably a binary alloy, of the type taught in U.S. application Ser. No. 356,657, now U.S. Pat. No. 4,470,714, filed Mar. 10, 1982, and assigned to the present assignee. The support layer 14 can be comprised of Mylar® while the conductive layer 18 can be comprised of aluminum. When aluminum is used for the conductor layer a metal silicide resistive layer is often used. Of course, the conductive layer 18 can be absent, so that the resistive layer 20 is applied directly to the support layer 14. Also, the resistive layer can be thick enough to provide support for the ribbon, so that support layer 14 will not be needed.

In the use of this ink-bearing ribbon, power is supplied to a stylus brought into electrical contact with resistive layer 20. The resistive layer is also in contact with a ground electrode. When the thin wire stylus is applied to those regions of the ribbon opposite the areas of the receiving medium 12 to which ink is to be transferred, the fusible ink layer will locally melt due to localized resistive heating. At the same time, the exothermic reaction will produce heat, aiding in the heating and transfer process by which the ink is transferred from the layer 16 to the receiving medium 12.

Any type of ribbon, such as those used in the prior art, can be utilized in the practice of this invention. The following will therefore provide only a representative description of the various layers comprising these ribbons.

Support layer 14 is generally comprised of an electrically non-conductive material which is flexible enough to allow the formation of spools or other "wrapped" packages for storing and shipping. It is capable of supporting the remaining layers of the ribbon and is comprised of a material which does not significantly impede the transfer of thermal energy from the resistive layer 20 on one side of the support layer to the fusible ink layer 16 on the other side, in order to increase the efficiency of printing. Of course, in the practice of this invention, this problem is minimized because of the exothermic heat which is provided. Although many materials may be employed as the support layer, the preferred material has often been Mylar® polyester film. Other suitable materials include polyethylene, polysulphones, polypropylene, polycarbonate, polyvinylidene fluoride, polyvinylidene chloride, polyvinyl chloride, and Kapton (a trademark of E. I. duPont de Nemours).

The thicknesses of the support layer and the other layers of ribbon 10 are controlled to some degree by the required transfer of thermal energy and the ability to store the ribbon material, as well as by the machinery in which the ribbon is used (for example, a computer terminal or typewriter). The support layer is often about two–five micrometers in thickness.

In the practice of this invention, any type of ink composition can be used, the inks generally being comprised of a low melting point polymer binder and a colorant. The ink composition of layer 16 is not flowable at room temperature, but becomes flowable and transferrable upon heating. This causes a transfer of ink from the ribbon 10 to the paper or other receiving medium during the printing process. A representative ink contains a polyamide and carbon black. A particular composition used as an example is Versamide/carbon black mixture, which melts at approximately 90° C. This ink composition and many others are disclosed in U.S. Pat. No. 4,268,368. In practice, the fusible ink layer 16 is typically 4–7 micrometers in dry thickness.

The support layer 14 may be coated with the fusible ink composition 16 by any of a number of well known coating methods, such as roll or spray coating.

In ribbon 10, the thin metallic layer 18 is typically 50–200 nm in thickness, a preferred thickness being approximately 100 nm. This layer must be thin since it tends to spread the heat produced by the current flow. In some ribbons, the conductive layer is a stainless steel strip, which also acts as the support layer. In other ribbons, the conductive layer 18 is omitted, and current flows only through the resistive layer. In this latter ribbon, heat is produced under the printing stylus by the current crowding which occurs there.

Resistive layer 20 is either applied to a free surface of support layer 14, or to the surface of metallic layer 18, as in FIG. 1. The resistive material can be any of those used in conventional resistive ribbon transfer printing, or the inorganic binary alloys described in aforementioned copending application Ser. No. 356,657. The metals employed in the resistive layer are chosen to be those which will not explosively, harmfully, or otherwise chemically react upon resistive heating. Metals such as nickel, cobalt, chromium, titanium tungsten, molybdenum and copper are suitable.

A resistivity of approximately 100–500 ohm square is preferred. Various compositional ranges are described in this copending application. Typically the thickness of the resistive layer is from about 0.5 micrometers to about 2 micrometers. The resistive layer is applied to the ribbon by well known techniques including vacuum evaporation and sputtering. Constant voltage power sources are preferred when binary alloys are used as the resistive material.

Figure 2:
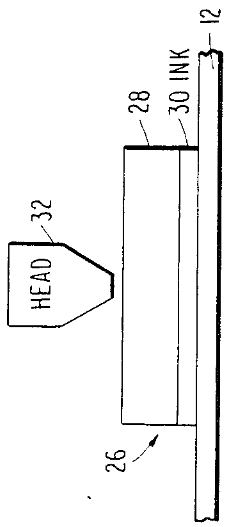
FIG. 2 illustrates another ribbon of the type used in resistive ribbon ink transfer, which does not include a conductive layer, where the aromatic azido compound of the present invention is present in the ink layer.

FIG. 2 represents an ink transfer ribbon 26 including a support layer 28 and an ink-bearing layer 30. The aromatic azido compound is present in the ink layer 30.

The ribbon of FIG. 2 is used in printing of the type where a thermal head 32 provides energy for melting the ink and transferring it to the receiving medium 12. Thus, the onset of energy from thermal head 32 causes an exothermic reaction in the ink layer 30, where this exothermic reaction aids melting and transfer of the ink to the receiving medium 12. In this embodiment, the amount of exothermic material located in the ink formulation is the same as that described previously.

Figure 3:
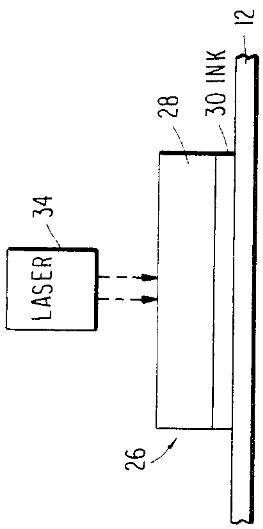
FIG. 3 shows another type of printing ribbon which does not have a resistive layer, and is the type used with thermal or laser printheads. The azido compound of the present invention is present in the ink layer.

FIG. 3 shows another type of thermal transfer printing using the same type of ribbon as that in FIG. 2. The only difference is that the thermal head is now a laser array 34. For this reason, the same reference numerals are used for ribbon 26, including support 28 and ink-bearing layer 30.

In other types of resistive ribbons, the support layer is not required, and the function of support is provided by the resistive layer. In this case, the resistive layer is thicker (about 15 microns). This eliminates some thermal mass and the fumes which could be produced when a separate support layer is used. Examples of ribbons which use the resistive layer as the substrate (i.e. support layer) are shown in U.S. Pat. Nos. 4,268,368 and 3,744,611.

The present invention finds application with thermal transfer inks in printing processes that utilize a thermal head, resistive heat or a laser as are known in the prior art whether these thermal transfer inks are water-based or organic solvent-based.

Ink transfer imaging by thermal printing processes for plain paper prints commonly employs a thermal head to heat and melt the ink layer coated on a base and directly transfer the ink to the receiving sheet pressed against the ink layer. Such printing processes are limited by the slow thermal response and ink transfer efficiency of conventional inks since the print quality and print density are characterized by the melting point and melt viscosity of the ink.

An alternative to thermal printing requiring the use of a print head in heat recording systems which utilize resistive heat to cause the ink to melt and undergo the reduction in viscosity necessary for effective transfer to plain paper. In this method, an electrically resistant layer is formed on one surface of an electrically conductive layer and an ink layer is formed on the other surface of the electrically conductive layer. When a signal current is fed from the side of the resistive layer by contacting the same with an electrode needle, the input of electrical energy causes the ink to melt locally due to electric resistance heating which results in image transfer to plain paper.

Most typically, per the present invention ink formulations containing an additive or additives having at least one aromatic azido moiety are coated on a substrate such as a polyimide, polycarbonate, metallized polycarbonate, Mylar®, polyethylene, etc., to form an ink layer which upon the application of heat, for example, from a thermal head or al electrical resistance heat, in response to electrical energy input, melts locally and is transferred to another support such as plain paper, resulting in image recording.

The melt viscosity of the ink is controlled by the input power in the printing operation and is one of the important parameters that determines the print quality, print density and ink transfer efficiency, which also depend on the relationship of supplied energy and the temperature acquired in response to that energy.

From the standpoint of improved performance and to prevent wearing of the print head, it is important that the thermal transfer ink melt and reach optimal print viscosity at low electrical energy input.

We have discovered that the addition of compounds containing at least one aromatic azido moiety (—Ar—$N_3$) to a thermal transfer ink, another layer, or a substrate, of a thermal ink transfer element, be the ink organic solvent-based or water-based, permits the transfer of the thermal transfer ink at a lower temperature, i.e, with lower print energy requirements, prolonged print head life due to the use of such lower print energy requirements, and causes an overall improvement in print quality.

So long as at least one aromatic azido moiety (—Ar—$N_3$, where Ar is typically phenyl) or an equivalent moiety is present, we believe that the aromatic azido compound will be useful in the present invention. Often the aromatic azido moiety will be linked to another aromatic azido moiety (—Ar—$N_3$), though this is not mandatory. Linkage may be, e.g., via a C═O group, an $SO_2$ group, an unsaturated hydrocarbon group, which may be substituted with, e.g., oxygen, or may contain a phenyl group which may itself be substituted, an unsaturated hydrocarbon group, oxygen, sulfur, etc. As the examples below show, however, linkage to another aromatic azido moiety is not mandatory.

The aromatic azido compounds of the present invention at relatively low electrical energy input undergo an exothermic decomposition reaction liberating sufficient additional thermal energy which causes a further reduction in ink viscosity resulting in more efficient ink transfer than is attainable without the presence of such additives.

So long as an aromatic azido provides the above results, it can be used with success in the present invention. It is observed that ink compositions can be obtained for use at any intended temperature depending on the thermal stability of the additives.

Preferred materials according to the present invention are mono- or di-functional aromatic azido compounds which can be divided into two different categories: (1) for incorporation into organic solvent-based inks; and (2) for incorporation into water-based inks. A typical example of category (1) is provided by 4,4'-bis(or di)azido-diphenylsulfone (A), which will undergo thermal decomposition with the loss of inert and highly stable molecular nitrogen, and the formation of electron-deficient species, such as dinitrene, and rapid energy dissipation and stabilization by a variety of modes such as hydrogen abstraction and/or coupling reactions. A highly beneficial effect encountered with the use of this particular aromatic azido compound is that its thermally-induced chemical transformation generates only $N_2$ as a volatile product in a highly efficient exothermic process starting at about 170° C. and the exotherm maximum occurs at relatively low temperature of about 181° C., which is highly desirable for use in low power thermal transfer ink printing processes. Further, this aromatic azido compound is essentially colorless, shows excellent shelf life and can be easily synthesized from commercially available starting materials in a conventional manner.

In addition to the above aromatic azido compound (A) in category (1), other aromatic azido compounds which should be useful in the present invention include:

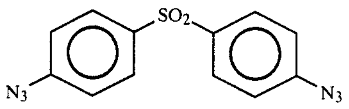

4,4'-Diazido-diphenylsulfone (A)

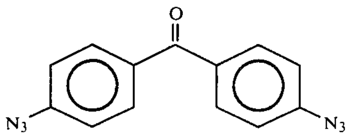

4,4'-Diazidobenzophenone

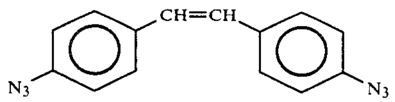

4,4'-Diazidostilbene

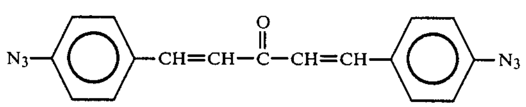

4,4'-Diazidodibenzalacetone

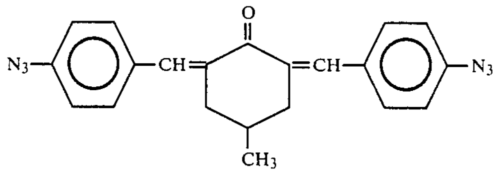

2,6-Di-(4-azidobenzal)-4-methyl cyclohexanone

-continued

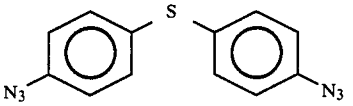

4,4'-Diazidodiphenylsulfide

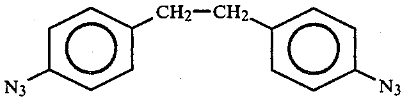

1,2-(4,4'-diazidodiphenyl)ethane

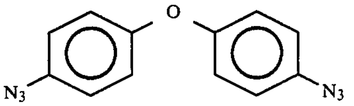

4,4'-Diazidodiphenylether

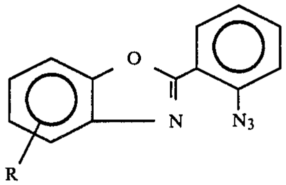

Azidobenzoxazoles
R = Hydrocarbon radical . . ., e.g., $C_1$–$C_6$

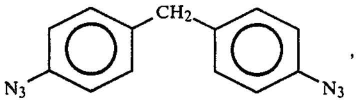

4,4'-diphenylmethane diazide

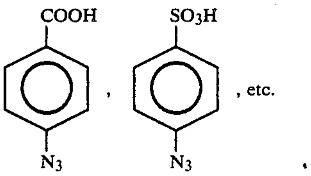

The above aromatic azido compounds find particular application in organic solvent-based thermal transfer inks and, when compounded with these inks to form a layer of the modified ink on a desired substrate, the solid thermal transfer ink typically shows an exotherm in the temperature range from about 170° C. to 200° C., corresponding to azido decomposition, thereby lowering the energy requirements for thermal ink transfer.

Any organic solvent can be used which will dissolve the binder(s) and aromatic azido compound(s) used for ease of application and which can be removed at a temperature below the aromatic azido compound's exotherm temperature, e.g., lower alcohols such as isopropanol. The amount of solvent is merely that needed for easy application of the ink to the support. It is preferred that the solvent(s) used have a relatively low boiling point, e.g. on the order of 75° to 120° C.

With the growing concern regarding toxicity, disposal, health hazards and environmental effects encountered with organic solvent-based systems in printing technologies, it would obviously be highly desirable if water-based thermal transfer inks could be developed having the same advantages in terms of improved ink transfer efficiency, reduced print head wear and improved print quality, as in the case of modified solvent-based inks described above.

In accordance with a second embodiment of the present invention, water-soluble aromatic azido compounds have been found to provide all of the advantages of the earlier described aromatic azido compounds but not to be subject to the indicated toxicity, etc., problems.

Such aromatic azido compounds fall in Category 2 as later described and carry a solubilizing group; so long as the aromatic azido compounds undergo exotherm, i.e., transformation at a temperature as is typically used for thermal ink transfer processes, and are water soluble, it is believed they will be useful in the present invention.

The aromatic azido compounds for use with water-based thermal transfer inks carry a water-solubilizing moiety such as —COOH, —$SO_3H$, or phenolic OH or —$SO_2CH_2SO_2$—functionality. Upon neutralization with a conventional organic or inorganic base such as sodium bicarbonate, sodium carbonate, triethylamine, tetramethyl ammonium hydroxide, etc., the same become soluble in aqueous solutions and provide stable and homogeneous formulations with water-based inks. Alternate additives useful according to this invention include azido compounds that can be used with water solvent-based systems as with water-based latex systems.

As is the case with the earlier discussed aromatic azido compounds it is only necessary that the aromatic azido compound contain at least one —Ar—$N_3$ moiety, or an equivalent moiety, which may be linked, if desired, to another —Ar—$N_3$ moiety. Representative linking groups are set forth below.

Specific examples of preferred water-soluble aromatic azido compounds include azido derivatives of benzoic acid.

| Category 2 | |
|---|---|
| 2-Azido benzoic acid | Registry No. 31162-13-7 |
| 3-Azido benzoic acid | Registry No. 1843-35-2 |
| 4-Azido benzoic acid | Registry No. 6427-66-3 |

p-Carboxybenzenesulfonyl azide,

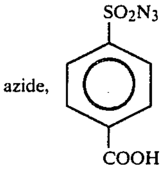

Sodium 4,4'-diazidostilbene-2,2-disulfonate

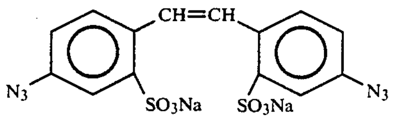

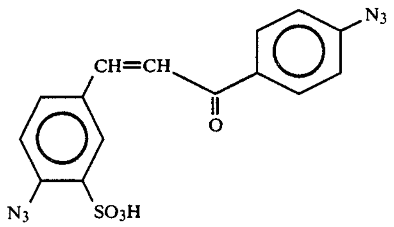

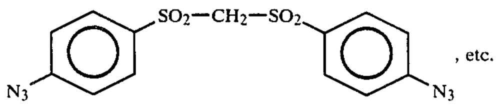

Among the above materials, some are commercially available while others can be easily synthesized by conventional reactions.

The amount of water used is merely that required for easy application of the ink to the support.

Thermal transfer inks as are conventionally used in the art and as are useful herein typically comprise from about 5 to about 20 weight percent pigment, basis being solids. Of course, where the binder itself provides the desired coloration difference or contrast, no pigment (or dye, an option to a pigment) is required; this is illustrated in Example 2. The additives of the present invention are most generally added in an amount from about 1 to about 20 weight percent based on the weight of solids, though those skilled in the art will appreciate greater and lesser amounts can be used.

As earlier indicated, the aromatic azido compound(s) per the present invention can be present in another layer of the thermal transfer element or in the support. All that is necessary is that its exothermic heat be supplied to the ink to promote transfer. An example would be a layer (not shown) between support 14 and ink layer 16 as shown in FIG. 1. Such could include, e.g., 1 to 20% of the aromatic azido compound(s) based on the binder used, e.g., a polyketone. When used in the support, an equivalent amount would be used.

Having thus generally described the present invention, the following examples are given to illustrate currently preferred modes of the invention.

EXAMPLE 1

A solvent-based control thermal transfer ink composition was formed by blending 0.2 part by weight of carbon black (XG-72R, Cabot), 2 weight parts of Versamide 871, having a melting point of ca. 70°-80° C., and 18 weight parts of isopropanol. Versamide 940 (m.p. ca. 100°-120° C.) is a possible replacement for Versamide 871.

Figure 4:
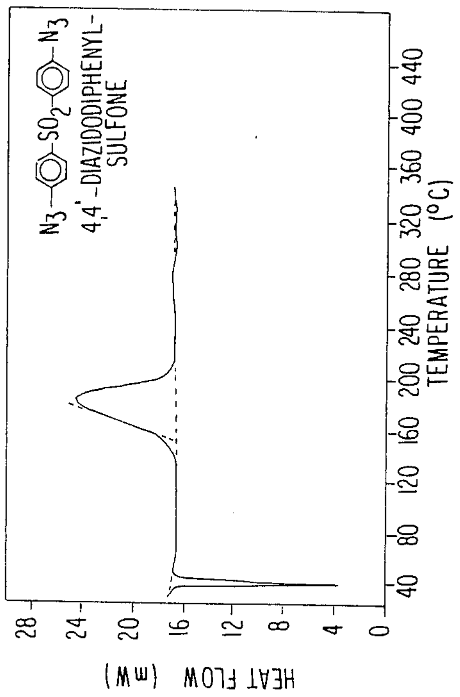
FIG. 4 is a DSC thermogram of the aromatic azido compound per se used in Example 1.
Figure 5:
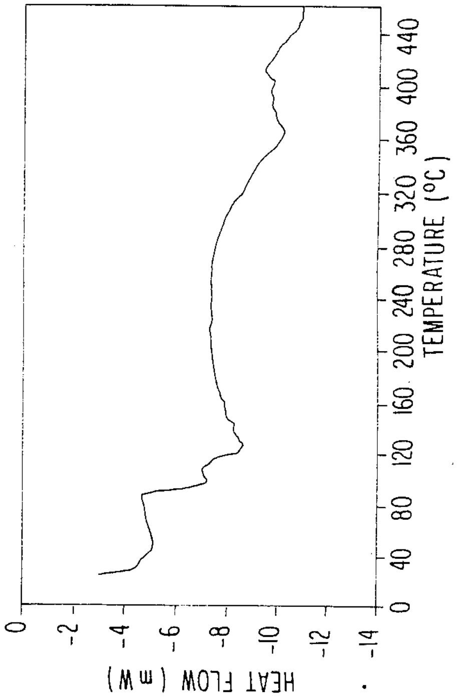
FIGS. 5 and 6 are DSC thermograms of the ink solids from a control thermal transfer ink and a thermal transfer ink per the present invention as described in Example 1, respectively.
Figure 6:
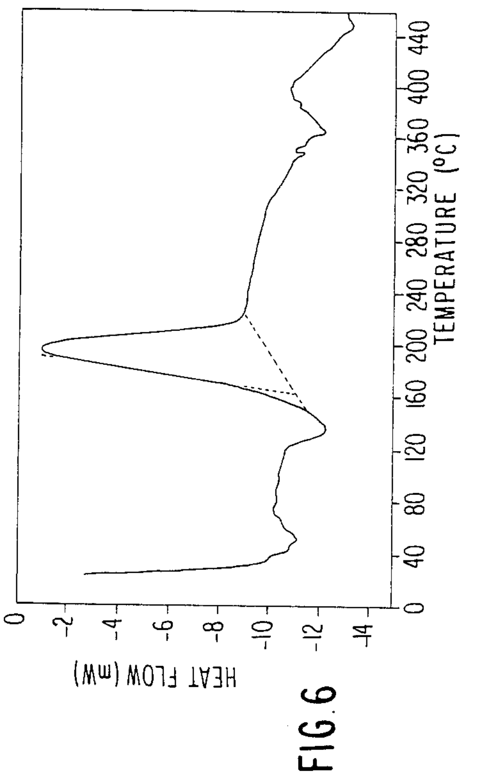

To this control ink composition was added 10 weight percent of 4,4′-bisazidodiphenylsulfone thereto based on control ink solids to obtain the improved ink composition in accordance with this invention. This ink composition was coated on Mylar$^R$ and the film was air dried to evaporate solvent to provide thermal ink transfer layer at a conventional thickness, i.e., 4–7 micrometers. The thermal profile of thus modified ink film relative to the control ink film, i.e., without the additive, was obtained by differential scanning colorimetry (DSC) on the film sample after stripping from the Mylar®. For this analysis, a duPont Thermal Analyzer Model 1090 was employed. DSC curves from the control ink sample and the modified ink in accordance with the present invention are shown in FIGS. 5 and 6, respectively. FIG. 4 provides the DSC thermogram for the additive alone in the absence of ink ingredients.

The magnitude of the exothermicity resulting from the thermally-induced decomposition of the aromatic azido compound in the ink formulation remained essentially the same as for the aromatic azido alone.

EXAMPLE 2

A control thermal transfer ink composition was formed by blending 20 g Versamide dispersed in 200 ml of water (at boiling) and 1 gm of 1-octadecylamine neutralized with acetic acid. No pigment is needed in this Example.

Figure 7:
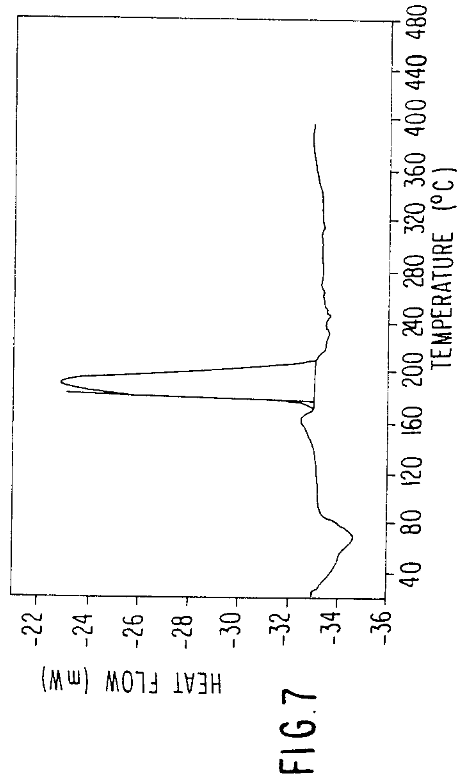
FIGS. 7 to 9 are DSC thermograms of p-azidobenzoic acid, the ink solids from a control thermal transfer ink and from a thermal transfer ink containing p-azidobenzoic acid per the present invention as described in Example 2, respectively.
Figure 8:
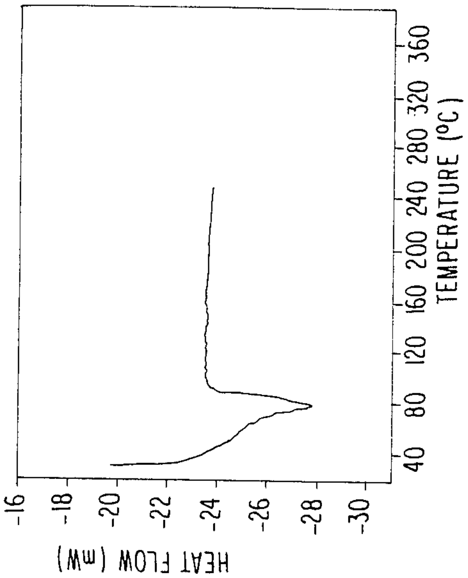
Figure 9:
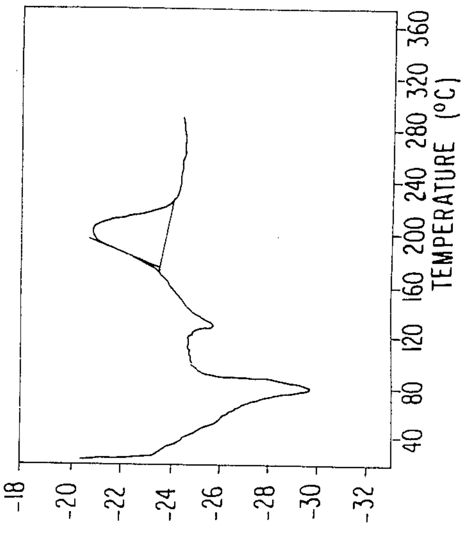

A thermal transfer ink in accordance with the present invention was formed by adding 10 weight percent p-azidobenzoic acid thereto based on total ink solids, specifically, 200 mg of p-azidobenzoic acid was dissolved in 10 ml of an aqueous solution containing 120 mg of sodium bicarbonate (about 20% excess) and was then added to 5 g of the recited water-based thermal transfer ink composition. After thorough mixing the ink was coated on a support such as Mylar® and the film was air dried to evaporate solvent to provide a thermal transfer ink layer of at a conventional thickness, i.e., 4–7 micrometers. DSC thermal profiles of this film in comparison to the similarly dried control ink film were obtained as in Example 1. DSC thermograms of p-azidobenzoic acid per se, the ink solid with the p-azidobenzoic acid and the ink solid without the p-azidobenzoic acid are shown in FIGS. 7, 8 and 9, respectively.

EXAMPLE 3

On the surface of an electric resistant film having a 10–20 μm thickness and comprising carbon black and polycarbonate in a weight ratio of 1:10 there is deposited a conductive film of aluminum by a conventional sputtering or vacuum evaporation at a thickness of 2–5 μm. By using the ink composition of Example 1, the ink layer is deposited on the Al surface by a conventional web coating process to form a 4–7 micrometer thick dry coating after drying. In printing experiments, the three layer recording sheet with the modified ink layer of this invention is placed in contact with a plain paper and a current is passed through a recording electrode in contact with the electrically resistant layer. The ink transfer required less than half the energy for recording them in the case of the control ink. Typically the current is on the order of 20 ma–30 ma.

While there has been described what are at present considered to be the preferred embodiments of this invention, it will be obvious to those skilled in the art that various changes and modifications may be made therein without departing from the invention, and it is, therefore, intended to cover all such changes and modifications as fall within the true spirit and scope of the invention.

We claim:

1. In thermal transfer printing an ink bearing ribbon comprising a support layer and at least one other layer, said one other layer including a fusible ink which is solid and stable at room temperature and which comprises an aromatic azido compound which is stable at room temperature but which exotherms at the conditions of the thermal transfer printing.

2. In a thermal transfer printing process wherein energy is applied to an ink-bearing ribbon to melt and transfer ink from said ink-bearing ribbon to a receiving medium for printing thereon, the improvement wherein some of the heat required for said printing is provided by an exothermic chemical reaction of an aromatic azido compound which is stable at room temperature but which exotherms at the conditions of the thermal transfer printing.

3. A ribbon as claimed in claim 1, where the fusible ink further comprises an organic solvent.

4. A ribbon as claimed in claim 1, where the fusible ink further comprises water as a solvent.

5. A ribbon as claimed in claim 1, where the fusible ink further comprises a polymer binder and a colorant.

6. A ribbon as claimed in claim 5, wherein said binder is a polyamide and said colorant is carbon black.

7. A ribbon as claimed in claim 1, wherein said aromatic azido compound contains the moiety —Ar—$N_3$, wherein —Ar— is an aromatic group.

8. A ribbon as claimed in claim 5, wherein said aromatic azido compound is selected from the group consisting of 4,4'-bis azido-diphenylsulfone,

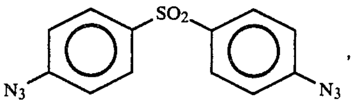

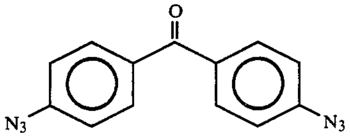

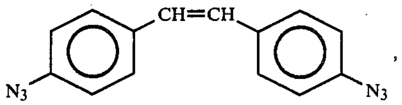

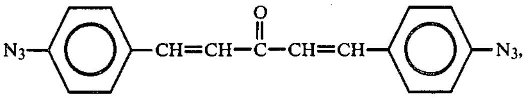

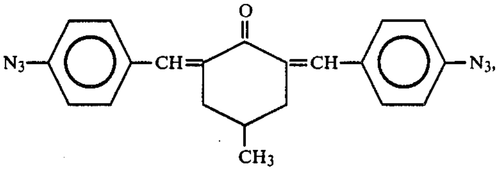

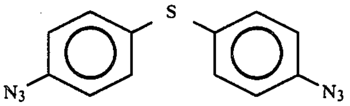

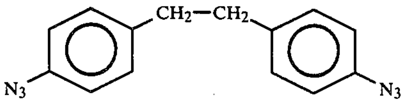

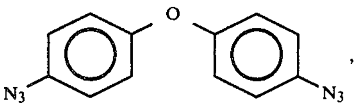

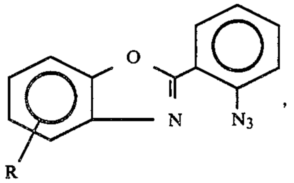

where R is a hydrocarbon radical having 1 to 6 carbon atoms,

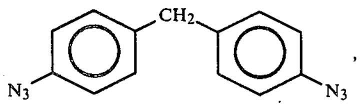

-continued

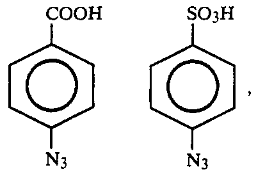

2-azido benzoic acid, 3-azido benzoic acid, 4-azido benzoic acid,

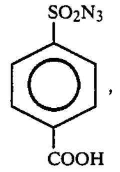

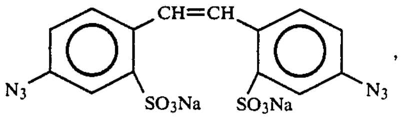

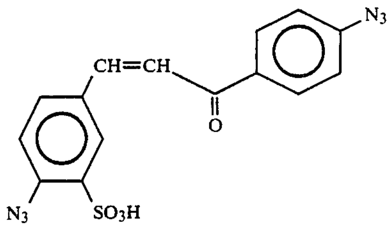

and

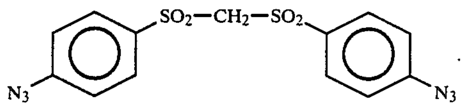

9. A ribbon as claimed in claim 7, wherein Ar is phenyl.

10. A ribbon as claimed in claim 4, wherein said aromatic azido compound comprises a water-solubilizing moiety.

11. A ribbon as claimed in claim 10, wherein said water-solubilizing moiety is selected from the group consisting of —COOH, —$SO_3H$, phenolic OH and —$SO_2CH_2SO_2$—.

12. A ribbon as claimed in claim 1, wherein the fusible incorporation of the fusible aromatic azido compound into the ink causes the ink to show an exotherm in the temperature range of from about 170° C. to 200° C.

13. A ribbon as claimed in claim 1, wherein the fusible ink comprises a binder and from about 1 to about 20 wt% of the fusible ink, based on solids, of the aromatic azido compound.

14. A ribbon as claimed in claim 1, wherein the fusible ink comprises from about 5 to about 20 wt% pigment and from about 1 to about 20 wt% of the fusible ink, based on solids, of the aromatic azido compound.

15. A ribbon as claimed in claim 1, wherein the fusible ink is in the form of a layer 4–7 micrometers in dry thickness.

16. A ribbon as claimed in claim 7, wherein said —Ar—$N_3$ moiety is linked to another —Ar—$N_3$ moiety via a C=O group, via an $SO_2$ group, via an unsaturated hydrocarbon group which may be substituted, via oxygen or via sulfur.

17. A ribbon as claimed in claim 1, where the fusible ink is in the form of a layer on a support.

18. A process as claimed in claim 2, wherein said fusible ink further comprises an organic solvent.

19. A process as claimed in claim 2, wherein said fusible ink further comprises water as a solvent.

20. A process as claimed in claim 2, wherein said fusible ink further comprises a polymer binder and a colorant.

21. A process as claimed in claim 20, wherein said binder is a polyamide and said colorant is carbon black.

22. A process as claimed in claim 2, wherein said aromatic azido compound contains the moiety —AR—$N_3$, wherein —AR— is an aromatic group.

23. A process as claimed in claim 20, wherein said aromatic azido compound is selected from the group consisting of 4,4'-bis azido-diphenylsulfone,

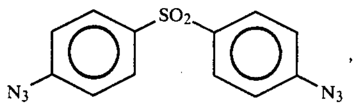

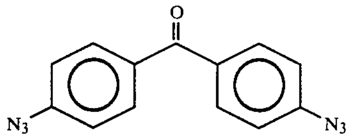

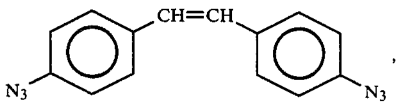

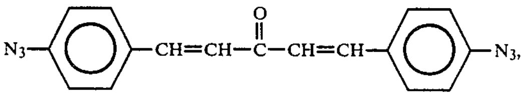

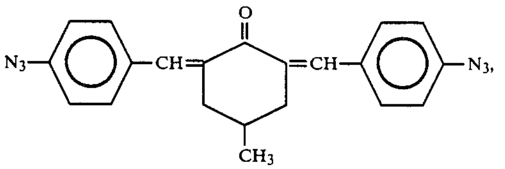

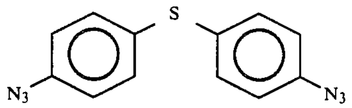

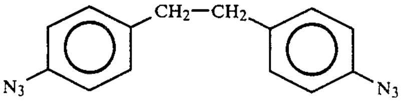

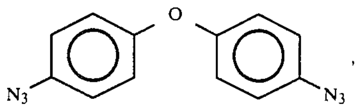

-continued

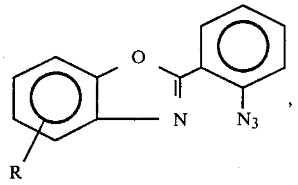

where R is a hydrocarbon radical having 1 to 6 carbon atoms,

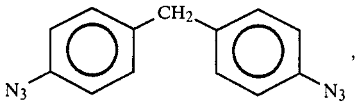

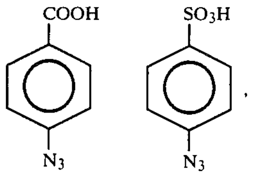

2-azido benzoic acid, 3-azido benzoic acid, 4-azido benzoic acid,

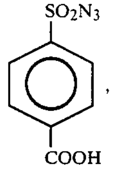

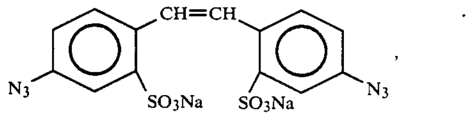

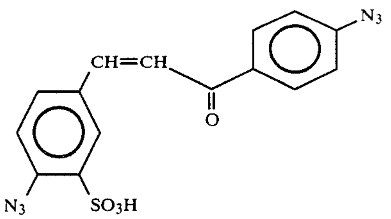

and

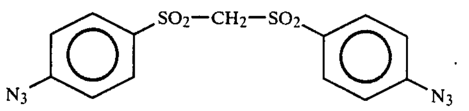

24. A process as claimed in claim 22, wherein Ar is phenyl.

25. A process as claimed in claim 19, wherein said aromatic azido compound comprises a water-solubilizing moiety.

26. A process as claimed in claim 25, wherein said water-solubilizing moiety is selected from the group consisting of —COOH, —$SO_3H$, phenolic OH and —$SO_2CH_2SO_2$.

27. A process as claimed in claim 2, wherein the incorporation of the aromatic azido compound into the fusible ink causes the fusible ink to show an exotherm in the temperature range of from about 170° C. to 200° C.

28. A process as claimed in claim 2, wherein the fusible ink comprises a binder and from about 1 to about 20 wt% of the fusible ink, based on solids, of the aromatic azido compound.

29. A process as claimed in claim 2, wherein the fusible ink comprises from about 5 to about 20 wt% pigment and a binder and from about 1 to about 20 wt% of the fusible ink, based on solids, of the aromatic azido compound.

30. A process as claimed in claim 2, wherein the fusible ink is in the form of a layer 4–7 micrometers in dry thickness.

31. A process as claimed in claim 22, wherein said —Ar—$N_3$ moiety is linked to another —Ar—$N_3$ moiety via a C═O group, via an $SO_2$ group, via an unsaturated hydrocarbon group which may be substituted, via oxygen or via sulfur.

32. A process as claimed in claim 30, wherein the initial member comprises the layer of fusible ink and a support.

33. A process as claimed in claim 30, wherein the ink bearing ribbon comprises the layer of fusible ink, a support, a conductive layer and a resistive layer.

34. A process as claimed in claim 30, wherein the fusible ink is transferred by application of heat from a thermal print head.

35. A process as claimed in claim 30, wherein the ink-bearing ribbon further comprises a resistive layer and the fusible ink is transferred by resistive heat generated by said resistive layer.

36. In a thermal transfer printing process wherein energy is applied to an ink-bearing ribbon to melt and transfer fusible ink from said ink-bearing ribbon to a receiving medium for printing thereon, the improvement wherein some of the heat required for said printing is provided by an exothermic chemical reaction of an aromatic azido compound which is stable at room temperature but which exotherms at the conditions of the thermal transfer printing process, said ink and said aromatic azido compound being present as separate layers.

37. A process as claimed in claim 36, wherein the fusible ink comprises an organic solvent.

38. A process as claimed in claim 36, wherein the fusible ink comprises a water as a solvent.

39. A process as claimed in claim 36, wherein said fusible ink comprises a binder and a colorant.

40. A process as claimed in claim 20, wherein said binder is a polyamide and said colorant is carbon black. CM 41. A process as claimed in claim 36, wherein said aromatic azido compound contains the moiety —Ar—$N_3$, wherein —Ar— is an aromatic group.

42. A process as claimed in claim 36, wherein said aromatic azido compound is selected from the group consisting of 4,4'-bis azido-diphenylsulfone,

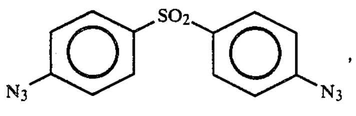

-continued

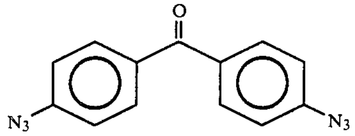

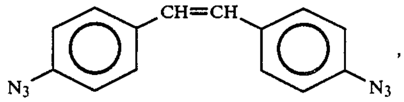

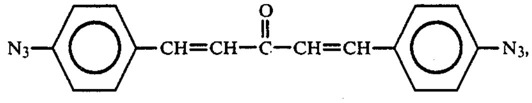

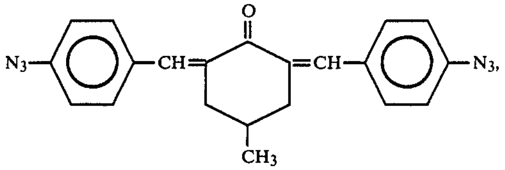

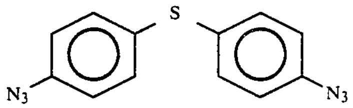

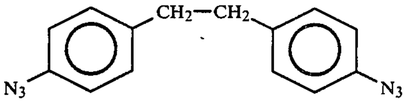

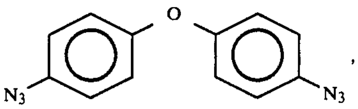

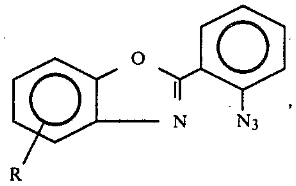

where R is a hydrocarbon radical having 1 to 6 carbon atoms,

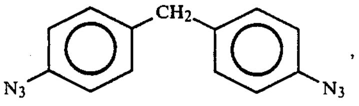

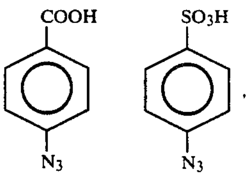

2-azido benzoic acid, 3-azido benzoic acid, 4-azido benzoic acid,

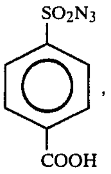

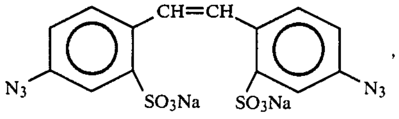

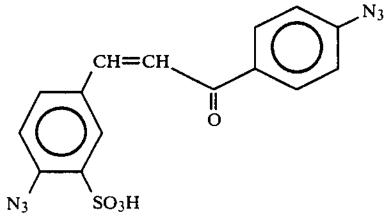

and

-continued

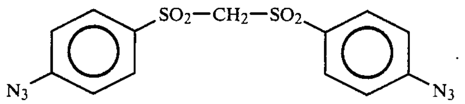

43. A process as claimed in claim 41, wherein Ar is phenyl.

44. A process as claimed in claim 38, wherein said aromatic azido compound comprises a water-solubilizing moiety.

45. A process as claimed in claim 44, wherein said water-solubilizing moiety is selected from the group consisting of —COOH, —$SO_3H$, phenolic OH and —$SO_2CH_2SO_2$.

46. A process as claimed in claim 36, wherein the aromatic azido causes the fusible ink to show an exotherm in the temperature range of from about 170° C. to 200° C.

47. A process as claimed in claim 36, wherein the fusible ink comprises from about 5 to about 20 wt% pigment and a binder.

48. A process as claimed in claim 36, wherein the fusible ink is in the form of a layer 4–7 micrometers in dry thickness.

49. A process as claimed in claim 41, wherein said —Ar—$N_3$ moiety is linked to another —Ar—$N_3$ moiety via a C═O group, via an $SO_2$ group, via an unsaturated hydrocarbon group which may be substituted, via oxygen or via sulfur.

50. A process as claimed in claim 36, wherein the ink-bearing ribbon comprises the layer of ink, a support, a conductive layer, a resistive layer and the layer of the aromatic azido compound.

* * * * *